United States Patent
Oikawa

[11] Patent Number: 5,644,556
[45] Date of Patent: Jul. 1, 1997

[54] MAGNETO-OPTICAL DISK HAVING CELLULARLY DIVIDED REGIONS WITH ALTERNATING DIRECTIONS OF MAGNETIZATION AND METHOD OF INITIALIZING DIRECTION OF MAGNETIZATION OF MAGNETO-OPTICAL DISK PRIOR TO RECORDING OF INFORMATION

[75] Inventor: Katsuya Oikawa, Tokyo, Japan

[73] Assignee: Canon Kabushiki Kaisha, Tokyo, Japan

[21] Appl. No.: 556,830

[22] Filed: Nov. 2, 1995

Related U.S. Application Data

[63] Continuation of Ser. No. 175,580, Dec. 30, 1993, abandoned.

[30] Foreign Application Priority Data

Jan. 11, 1993 [JP] Japan ................... 5-002701

[51] Int. Cl.$^6$ ................... G11B 11/00
[52] U.S. Cl. ................... 369/13; 369/116; 360/114
[58] Field of Search ................... 369/13, 14, 110, 369/116, 275.2, 275.3, 275.4, 100, 47, 54, 58, 59; 360/114, 59; 365/122

[56] References Cited

U.S. PATENT DOCUMENTS

| | | | |
|---|---|---|---|
| 5,014,254 | 5/1991 | Van Rosmalen et al. | 369/13 |
| 5,065,377 | 11/1991 | Spruit et al. | 369/13 |
| 5,077,714 | 12/1991 | Katayama et al. | 369/13 |
| 5,126,985 | 6/1992 | Spruit et al. | 369/13 |
| 5,295,121 | 3/1994 | Sukeda et al. | 369/13 |
| 5,323,366 | 6/1994 | Watada et al. | 369/13 |
| 5,371,721 | 12/1994 | Greidanus et al. | 369/13 |

*Primary Examiner*—Ali Neyzari
*Attorney, Agent, or Firm*—Fitzpatrick, Cella, Harper & Scinto

[57] ABSTRACT

A magneto-optical disk is of a type in which magnetic record pits are formed by thermomagnetic recording on a magnetic member and the pits are read utilizing the photomagnetic effect. The disk has cellularly divided regions arranged along a track direction on both sides of an information track on which a signal pit string is formed. The divided regions have alternately changing directions of magnetization. The magneto-optical disk is magnetized such that a focused laser beam is irradiated on the disk and an alternating magnetic field is applied to a portion irradiated by the laser beam.

4 Claims, 3 Drawing Sheets

MAGNETO-OPTICAL DISK HAVING CELLULARLY DIVIDED REGIONS WITH ALTERNATING DIRECTIONS OF MAGNETIZATION AND METHOD OF INITIALIZING DIRECTION OF MAGNETIZATION OF MAGNETO-OPTICAL DISK PRIOR TO RECORDING OF INFORMATION

This application is a continuation of application Ser. No. 08/175,580, filed Dec. 30, 1993, now abandoned.

BACKGROUND OF THE INVENTION

1. Field of the Invention

The present invention relates to a magneto-optical disk and a method for magnetizing the disk, and more particularly to a magneto-optical disk which is initially magnetized before shipment or prior to being used and to a method for magnetizing the disk.

2. Related Background Art

Thermomagnetic writing (or recording) is mainly employed for recording data in a magneto-optical disk. It is a method for writing data at a Curie point on a recording magnetic layer utilizing a temperature rise under irradiation of a laser beam. The recording is effected by forming regions having different magnetic properties on the disk. This means that a geometric pattern corresponding to information to be recorded is formed on the disk. The magneto-optical disk is characteristic particularly in that the thus recorded pattern can be optically read utilizing the magneto optical effect.

The magneto-optical disk is principally used in the field of electronic information processing, for example in computers at present. Therefore, the recorded pattern is binary code data. Specifically, the pattern is recorded in the form of a string of pits, each of which is a closed region having a shape of a circle, ellipse or elongate ellipse. The current majority of magneto-optical disks utilize light, specifically a laser beam for writing (recording) or reading (reproduction), as described above. Namely, the data writing is effected by the thermomagnetic writing through light absorption, heating and temperature rise in a portion irradiated by a laser beam, and the written data is reproduced or detected utilizing the magneto-optical effect on reflected light or on transmitted light from the irradiated portion. The recording medium is moved relative to the laser beam (i.e., the laser-beam-irradiated portion as described above relatively moves on the recording medium) to perform conversion of time-series electronic data into a geometric (pit) pattern on the recording medium or to perform reverse conversion. Specifically in case of the magneto-optical disk, a disk recording medium (hereinafter referred to simply as a disk) is rotated at a constant linear velocity or at a constant angular velocity, whereby the relative motion is made between the laser beam and the disk. Therefore, a data string (pit string) is formed in the geometric pattern corresponding to the time-series data in the tangential direction of disk on the disk. During the disk rotation, the laser beam is also shifted in the radial direction of disk, whereby the data string of the geometric pattern is also expanded in the radial direction of the disk. This expansion may be done by conventional procedure, for example in a spiral pattern as in (acoustic) record disks of well known arrangement, or in a pattern of concentric circles as known in the field of floppy magnetic recording disks. In other words, the two-dimensional geometric pattern on the disk is signified as a one-dimensional geometric pattern string which can be converted into time-series data. This string is called hereinafter an information track. There are various disks known as described, including a disk with a single spiral information track extending thereon and a disk with concentric circles as information tracks. Normally, the information track often has a three-dimensional geometric structure on the disk. Namely, there are lands and grooves formed on the surface of disk. The magneto-optical pits are formed on the lands. The lands extend in a spiral pattern or in a concentric pattern on the disk, forming the information track(s). On the other hand, the grooves are formed as projected or recessed on either side of land. The grooves constitute a sort of diffraction grating together with the lands because of their height difference, so that diffraction-reflected light emerges therefrom upon irradiation on the disk with the laser beam, as detailed hereinafter. While a drive device receives this diffraction-reflected light to detect a relative position of the laser-irradiated portion relative to a land or a groove on the disk, it carries out scanning of a laser beam along the land portion. This tracing scan is often called a land trace and the tracing control is referred to as tracking servo.

It is evident that data density increases on the disk as the area of a laser-irradiated portion for writing or reading on the disk decreases and that with the decrease in area of the irradiated portion, an amount of data which can be handled within a unit time at a constant rotation speed of disk also increases. The laser-irradiated portion is hereinafter called and a spot. For the above reason, it is preferred for magneto-optical disks that the spot is formed as small as possible. In the currently available systems, the laser beam is focused in a spot of diameter of about 1 to 2 μm to irradiate the disk thereby.

The thermomagnetic recording on the magneto-optical disk is further described below. The magneto-optical information recording is identical to the other methods of magnetic information recording in that the recording is made by fixing the orientation of spontaneous magnetization in a magnetic recording medium which is ferromagnetic. In detail, the aforementioned geometric pits are discriminated one from another by the orientation of spontaneous magnetization. Relatively scanning the spot on the medium disk as described above, a part of a beam in the spot is absorbed by the spot area on the disk at a certain time to heat the portion and raise the temperature thereof. As well known in the fields of the magnetism physics and the magnetic recording technology, a ferromagnetic material changes the spontaneous magnetization (moment) with a change in temperature and particularly the spontaneous magnetization disappears over the critical temperature Tc (this critical point of phase change is called a Curie point in the field of magnetism). Thus, when the temperature rise brings the portion over or near the Curie point, the spontaneous magnetization will disappear or become very weak. Then, applying a magnetic field with suitable strength from the outside, the spontaneous magnetization of the portion can be aligned with a certain direction.

Describing in more detail, the temperature-increased portion, as the spot moves is cooled to finally reach the ambient temperature around the disk. If the portion is kept within a region of influence of the external magnetic field thus applied before the magnetic material recovers a certain strength of spontaneous magnetization in the cooling process, the spontaneous magnetization is fixed in a certain direction depending upon the direction of an applied magnetic field to form a fixed area. The magnetization is fixed in the direction perpendicular to the surface of the magnetic layer in the field of the art.

As described above, the thermomagnetic recording utilizes the temperature dependency of spontaneous magnetization as follows: a temperature rise makes a portion have a lower strength of spontaneous magnetization than that at room temperature, the magnetization in the portion is arranged in a certain direction in the applied magnetic field (which has a lower intensity than that at room temperature) and the portion is cooled to fix the spontaneous magnetization therein. Therefore, the geometric shape of a thus produced record-magnetized area (pit) is influenced by a temperature distribution on the disk made by the spot or the applied magnetic field.

Meanwhile, the reading is highly dependent upon the geometric shape of pit, as well known. The reading from a magneto-optical disk uses reflected light (or transmitted light) from the spot of a laser beam for reading, as described above. (Although the following description concerns only the reflected light, the description can be applicable to the transmitted light.) An additional feature of the magnetic recording member in the magneto-optical information recording medium is that the member is made of a material having a great magneto optical effect (which is well known as the Kerr effect for reflected light and the Faraday effect for transmitted light).

As generally well known in the fields of the art and the optical physics, such a material has two types of index of refraction with proper circularly-polarized components, so that the reflected light or transmitted light may have polarization components different from those of incident light. This change also depends upon the direction of incident light (polarization) and the direction of spontaneous magnetization. The polar Kerr effect is presently used by the majority of magneto-optical disks. In such magneto-optical disks, the direction of spontaneous magnetization is the normal direction or the reverse direction parallel to the traveling direction of an incident (reflected) beam, the reflected light is elliptically polarized with the major axis inclining to the incident polarization of the incident light linearly polarized, and the major axis of elliptic polarization is inclined in two different directions depending upon the normal or reverse direction of spontaneous magnetization. Accordingly, the direction of magnetization can be read out from the spot portion on the medium by detecting the difference in inclination direction by a polarization detecting device. The polarization detecting device can apply any one of many well known detecting methods to the detection.

Generally, a spot includes a pit region in which the magnetization is arranged by writing in a certain direction, and the other region. Among the reflected light from the spot portion, a reflected beam from the pit region gives an output through the above-described polarization detection and a reflected beam from the other region than the pit region another output. The total output is a sum of these outputs over the entire area in the spot portion. In particular, it is apparent that the minimum and the maximum output signals are given when a pit center is located at the center of a spot portion and when the spot portion includes no pit, respectively.

With a relative scan using a spot as described above, the area of a pit portion changes in the spot. Therefore the detected output signal also changes with the area change. Using this fact, the geometric information pattern on the medium is converted into a time-series (electric) information string.

The recording technique for a magneto-optical disk arranges the magnetization in a specific direction in a local area on the recording medium, thus performing the thermomagnetic recording. There are roughly two methods known for the localization. One of them is a method for controlling the temperature rise by modulating the intensity of recording laser beam while the other is a method for controlling the localization by modulating the applied magnetic field (direction of field). These two methods have respective advantages and disadvantages and are different from each other for example in respect of a shape of a of formed pit. In case the modulation of a laser beam is carried out using binary signals obtained by encoding ON and OFF, a teardrop-shaped pit is formed. This is understood as follows. A high temperature portion appears locally on the medium with an ON signal of the laser. The temperature distribution in this portion is represented by four-cornered isotherms, which are prolate in the moving direction of the spot upon scanning and are wide at the tail due to heat accumulation while being tapered off at head like a teardrop. As described above, the spontaneous magnetization disappears or is weakened near or over the Curie point (or compensation point) and the portion is cooled under application of an external magnetic field with an OFF signal of the laser or after passing the spot to fix the magnetization near a certain temperature. This is the reason why the pit has the shape of a teardrop projecting at the both ends of head and tail reflecting the isotherms upon temperature rise. In contrast, in case the direction of magnetic field is modulated according to binary information, an arrow-tail pit is formed with the head projecting in the opposite direction to the spot movement, reflecting isotherms upon cooling after passing the spot. This difference is caused by a difference in cooling process. In more detail, the laser modulation method has a cooling process in which the head of pit is formed after passing the spot while the tail of pit before passing the spot (after the laser is turned off). On the other hand, the magnetic modulation method has a cooling process in which the both ends of pit are formed after passing the spot.

This difference of pit shape causes the following difference in reading signal. If writing or reading is carried out without any correction for ON, OFF repeating signals with the same length, the laser beam modulation method is likely to have an offset difference due to a frequency difference. This is because a ratio of shape or area between a pit portion and a non-pit portion within the spot changes depending upon the frequency. This results in decreasing the margin when the information obtained in reproduction is decoded into binary signals. Therefore, correction might be required according to the frequency in writing in some cases. This tends to be affected by variations in writing laser control, thermal sensitivity of medium, etc.

In contrast, the magnetic modulation method is unlikely to cause the offset due to the frequency difference and thus requires no specific correction in writing, because the both ends of a pit are formed in the same thermal process. Let us consider these phenomena in respect of heat. In the magnetic modulation method, the spot as a heat source moves at an almost constant speed in the time scale for pit formation to produce a state in thermally approximate equilibrium or a state in non-equilibrium but in a very stable state. In the optical modulation method, the time scale of ON and OFF of laser is equivalent to the time scale of pit formation (even with the writing correction), and therefore it is highly dependent upon heating area or conduction. Speaking from the viewpoint of pit formation directly related to the reading signal, it is very difficult to stably produce a constant shape for the head or the tail of pit or for several adjacent pits. This means that an important point is to control the laser as a heat source within a very short period corresponding to the pit shape.

Also, there is another difference between the two methods. In the optical modulation method, the size of a formed pit is substantially determined by the size of a laser beam spot utilized as a heat source, while in the magnetic modulation method, the pit length in the spot scanning direction or in the track direction is determined by the time interval of an applied external field and the scanning speed of the spot. Thus, the magnetic modulation is effective to form a pit with shorter pit length as compared with the spot size. Since the magnetic modulation is effected while inverting the applied field at high speed as described, it is difficult for the field generating means (which is theoretically an electromagnet referred to as a magnetic head) to produce a strong magnetic field. Therefore, the field generating means is usually mounted on an aerodynamic slider so that the magnetic field can be applied only to the area near the laser spot while a constant distance is maintained with respect to the recording surface of a disk magnetic layer.

The conventional magneto-optical disks, however, had the following drawbacks.

FIG. 1 is a drawing to schematically show a state of pit formation in information recording on a conventional magneto-optical disk. Numeral 31 designates a recording layer in the magneto-optical disk and 32 a writing laser focusing beam. The temperature rises in a portion irradiated by the laser in the recording layer to decrease the spontaneous magnetization. The external magnetic field Hex is applied to the irradiated portion (upward in FIG. 1) to align the magnetization with a determined direction (upward in FIG. 1). As the laser beam moves (or is turned off), the magnetization in the portion is fixed upon cooling to form a magnetized pit. The size of pit produced in this occasion depends upon the strength of external applied field Hex as well as the spot size and the light intensity of the irradiating laser beam on the recording layer. Thus, the strength of magnetic field Hex affects the quality of recorded information signal. The recording layer, however, is also affected in actual pit formation by a leaking field Hp caused by magnetization Mp in the surrounding recording layer in addition to the external magnetic field Hex. Specifically, the conventional magneto-optical disks have grooves for servo on the both sides of each land on which the recording pits are actually formed. The magnetization in the adjacent grooves produces a leaking field, which affects the strength of magnetic field actually applied in pit formation, thereby influencing the recording properties. (Since the grooves are in a region out of a user's recording area, the leaking field cannot be controlled by the drive device.)

Incidentally, the conventional magneto-optical disks are shipped after the entire surface of each disk is initially magnetized in a certain direction. Therefore, grooves adjacent to a land subjected to pit formation are uniformly magnetized and the leaking field from the grooves had the greatest adverse influence on the recording properties (magnetic sensitivity of disk).

Summarizing the above, the drawbacks of conventional magneto-optical disks are listed as follows.

(1) The recording properties, especially the noise properties, change depending upon the leaking field influencing the external magnetic field set by the drive device.

(2) Further, the degree of correction for the leaking field cannot be uniquely determined on the drive side, because the strength of leaking field depends upon the disk. Therefore, matching is difficult for a combination between drive and disk.

(3) The direction of initial magnetization upon shipment could vary in a disk, which may cause a variation of leaking field depending upon a location, resulting in causing a change in recording properties.

The third drawback can be avoided by uniform magnetization upon shipment, but the other drawbacks cannot be avoided.

Further, these drawbacks become outstanding as described below in case of the magneto-optical disk employing the magnetic modulation.

(4) In the magnetic modulation method, a pit is formed by modulating the external magnetic field. Namely, the polarity of external field is inverted according to the information so as to change the polarity of induced magnetization on the recording layer. The difference in polarity produces a pit. In the pit formation, a leaking field adds a DC component to the external field on the recording layer, causing a great change in recording properties, especially in sensitivity of recording field. In the magnetic modulation method in which the external field has to be inverted at high speed, the difference in sensitivity of recording field raises a big problem in improving the density, the transfer rate, etc. of information signals recorded in the disk.

SUMMARY OF THE INVENTION

The present invention has been accomplished taking the above problems into account. It is a first object of the present invention to provide a magneto-optical disk with less leaking field. Further, it is a second object of the present invention to provide a magnetization method by which the leaking field caused by the magneto-optical disk can be decreased.

The above first object can be achieved by a magneto-optical disk in which magnetic recording pits are formed by thermomagnetic recording on a magnetic member and from which the recording pits are read utilizing the magneto optical effect, which has cellularly divided regions at least arranged along a track direction on the both sides of an information track formed by a signal pit string and having alternately changing magnetization.

Also, the above second object can be achieved by a magnetization method for magneto-optical disk comprising a step of irradiating the disk with a focused laser beam and a step of applying an alternating magnetic field to a portion irradiated by the laser beam.

In the magneto-optical disk according to the present invention, the self leaking field of disk sensed in the recording layer is averaged in the region where a pit is to be formed on the recording layer, when a user forms the pit by the thermomagnetic writing in recording, because the surrounding regions are cellularly magnetized in alternately changing directions. The averaging effect makes the leaking field weaker than that in a conventional disk initially magnetized uniformly in a direction. The averaging effect of self leaking field is outstanding in particular if the size of the cellularly magnetized regions with the cellularly alternately changing directions is equivalent to or smaller than the size of pit in user's use.

Also, the cellular magnetization alternately changing the magnetization direction is applied to groove regions adjacent to a land region for use of user recording, whereby the self leaking field from the surrounding recording regions, which could most affect the pit formation in user recording (because of the proximate location thereof), can be averaged and the effect is stable with time after shipment.

DESCRIPTION OF THE PREFERRED EMBODIMENTS

Embodiment 1

The present invention will be described in more detail. The first embodiment of the present invention is directed to such an arrangement that cellular magnetized regions having alternately changing directions of magnetization are formed upon shipment in a region including a land portion and a groove portion adjacent thereto under irradiation of laser beam with a power over a reference laser power and under application of alternating magnetic field, or directed to a magneto-optical disk formed by the method.

The reference laser power is determined depending upon the sensitivity of disk and the rotation speed thereof employed. The lower limit of the reference laser power is a recording power by which C/N saturates in reproduction. If a pit is recorded with the C/N saturation recording laser power, the pit is recorded in a full width of land. In a normal drive device, a pit extends into a groove or grooves when recorded with a power over the C/N saturation recording laser power. With such a drive device, the recording is never conducted with a power over the C/N saturation recording laser power in order to keep the recording durability of the disk higher or because of the output limit of a laser source in the drive apparatus. In the first embodiment of the present invention, one of features of the arrangement is that the magnetization is effected with a recording laser power over the upper limit of recording laser power for normal recording, and the thus magnetized disk.

Figure 1:
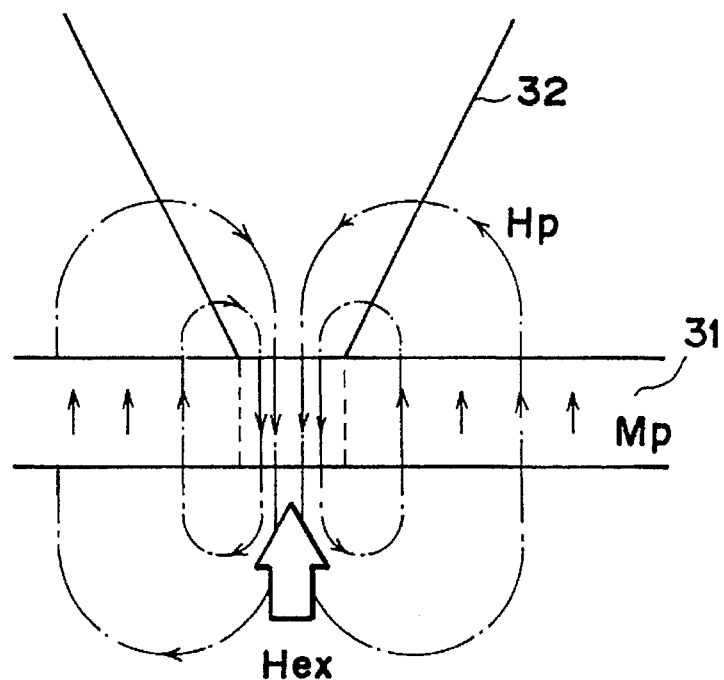
FIG. 1 is a drawing to show the influence of magnetic field in writing on a conventional magneto-optical disk.
Figure 2:
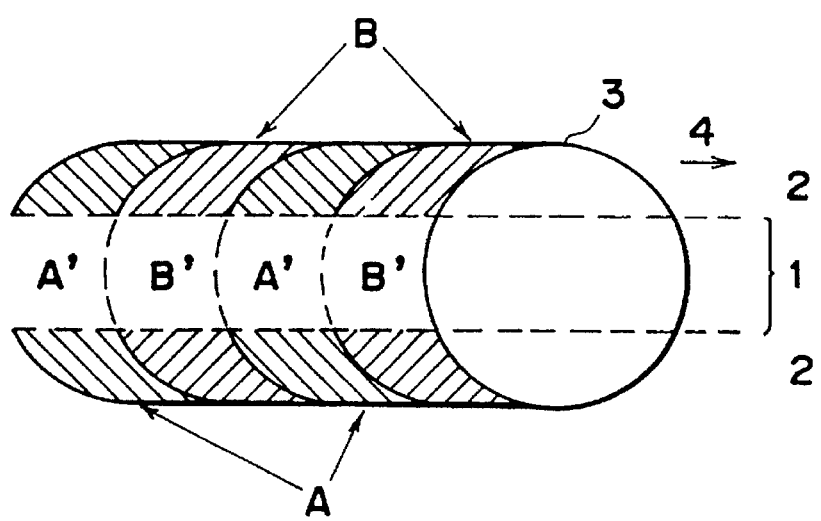
FIG. 2 is a drawing to show an example of a magnetized region in a magneto-optical disk according to the present invention.

The magneto-optical disk in the first embodiment is described in detail referring to FIG. 2. Numeral 1 denotes a land, 2 a groove and 3 a spot of laser beam for magneto-optical magnetization. The spot moves in the direction of 4 in scanning and unrepresented external field applying means applies an alternating magnetic field to the disk. Since the magnetization is effected with a power over the regular power as described above, cellularly magnetized regions are formed as shown by A', B' on the land and A, B in a land-side region in each groove. Here, A, A' are magnetized regions having the same magnetization direction while B, B' magnetized regions having the same magnetization direction but different from the magnetization direction of A, A'. When a pit is formed on the land 1 on the thus magnetized disk, leaking fields from surrounding magnetization cancel each other to permit recording with loyal recording properties to the external field, because the regions surrounding the portion of writing spot (which is a region in which the pit is to be formed) are cellularly magnetized in the approximately same size as the pit and in alternately changing magnetization directions. In FIG. 2, A', B' are on the land, on which a user will record or magnetize pits after the initial recording. However, A, B on grooves remain as magnetized regions, because the writing power of user drive is lower than the regular power. Further, since the leaking field becomes stronger as the distance to the magnetization as a source thereof decreases, the effect of leaking fields is outstanding from grooves closer to the pit (especially from the land-side portion) in formation of information pit. Therefore, by magnetizing the land-side regions in grooves as shown by A, B, the canceling effect of leaking fields is also effective in overwriting.

As the laser power for magnetization increases, a magnetized region increases its size in the groove and the canceling effect of leaking fields is further enhanced. However, a too high power density causes deterioration of disk recording layer. Therefore, the laser power is preferably set between the lower limit of the aforementioned C/N saturated power, which is used as the recording laser power of user drive and the upper limit of recording laser power with which the recording layer could be deteriorated.

Also, as the frequency of alternating field increases, the cellular unit for magnetization becomes smaller and the averaging cancellation effect of leaking fields becomes more enhanced, which is preferred. However, the frequency must be determined considering the performance of field applying means. Since the cancellation effect becomes outstanding with pit length about 1 to 2 times longer than the information pit length formed by user, the lower limit of frequency is preferably set to one for magnetizing approximately the length of information pit.

Next described in detail is the magnetization method in the first embodiment.

In the present embodiment, an example of magnetizing means has means for focusing a laser beam on a land on disk, scanning and controlling means for relatively moving a laser beam spot along the land on disk to scan it, and magnetic field generating and applying means for applying an external alternating magnetic field to the land. Specifically, the magnetizing means may be constituted using an ordinary disk inspector machine for magnetic field modulation, an ordinary disk dynamic characteristic meter and an ordinary disk drive as improved in rotation speed of disk.

Figure 4:
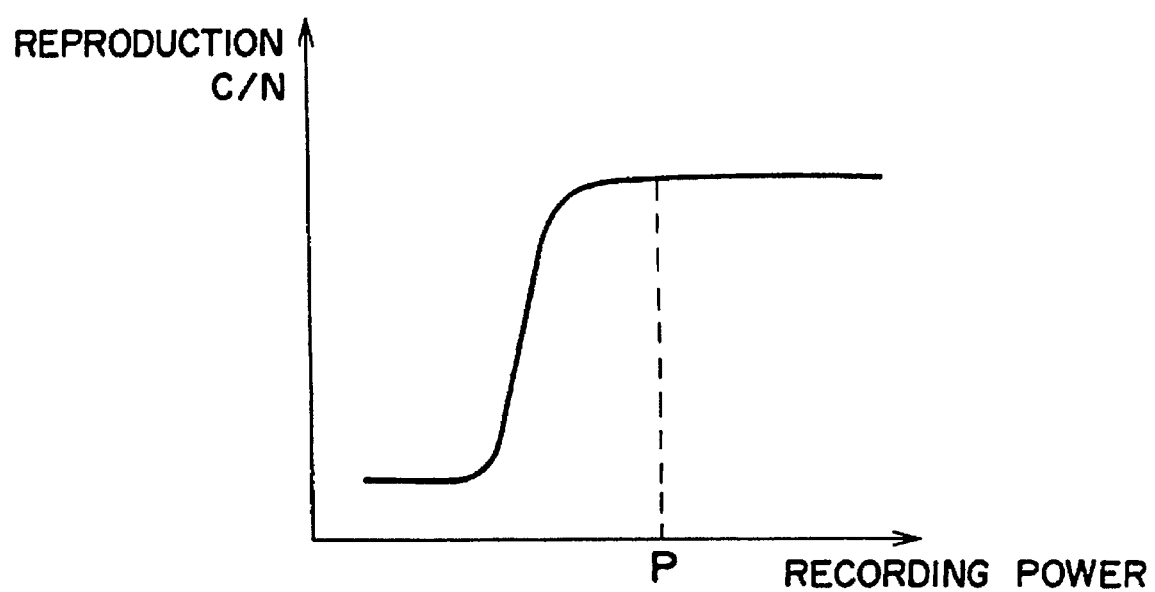
FIG. 4 is a drawing to show recording properties in a magneto-optical disk according to the present invention.

FIG. 4 is a graph to show the optical sensitivity of disk. The vertical axis indicates C/N while the horizontal axis the irradiation power. The C/N almost saturates with a power at point P. With this power, a pit is formed in approximately full width of land.

The regular power for writing a pit in a groove was set as 1.5 times greater than P, and writing (magnetization) was carried out with a power over this regular power while tracing the land.

Since the C/N saturation power P is linear to the disk rotation, that is, to the writing linear speed, if the disk is rotated at a lower disk rotation speed than that in use the magnetization can be effected above the regular power without requiring excessive laser power of magnetization drive device.

For example employed was a disk in which C/N saturates with a power of 8.3 mW at linear speed of 10 m/sec. This linear velocity corresponds to rotation of 2400 rpm for a disk of radius r=40 mm, which can be achieved by a conventional disk drive device. A power 1.5 times as high as the C/N saturation power at this linear velocity exceeds 12 mW, which cannot be obtained as a laser output on the disk surface by the ordinary drive device, inspector, etc. However, when the disk is rotated at the rotation speed of 900 rpm, the linear velocity is for example 3.8 m/sec even at radius 40 mm.

The C/N saturation laser power is 6.6 mW at linear velocity 3.8 m/sec, and a laser power 1.5 times higher than that is 9.9 mW, which can be achieved by an ordinary disk inspector. Thus with this value as the regular value, magnetization was conducted in the magnetic modulation method, whereby cellular magnetized regions were formed with magnetization alternatingly changing on either side of land.

As described above, the magneto-optical disk of the present invention can be produced easily and simply in the present invention by a conventional disk inspector, disk dynamic characteristic meter, or disk drive adjusted in rotation speed, which can modulate the magnetic field.

Also, the present embodiment may involve another specific method for magnetization by a magnetic modulation drive having a high-power laser source. As such a light source (which is preferably a light source having an oscillation wavelength equivalent to that of the semiconductor laser used in actual use of disk in respect of light absorption heating characteristics of disk), a high-power semiconductor laser source can be used. Lasers such as YAG laser, glass laser, gas laser, etc. may be used in respect of output limit (though they are a little inferior in heating efficiency for thermomagnetic magnetization because the oscillation wavelength is a little different). When the thermomagnetic magnetization is effected using a light source of such high-power laser, the rotation speed of disk upon magnetization can be increased so as to shorten the time for magnetization.

Further described is a preferable specific method of magnetization for the present embodiment.

In this example, the width of spot of laser beam in the direction perpendicular to the track on the disk recording layer for thermomagnetic magnetization is greater than the diameter of reading or writing laser spot in user's use of the disk, and preferably is set to cover grooves on the both sides of land in the direction of width. When the disk is heated by such a spot expanded in the direction of width, magnetization is effected in expanded width in the direction perpendicular to grooves to extend the magnetized region in the grooves. If a spot has a narrower width in the direction perpendicular to track even with the same laser power, a quantity of light is concentrated in the central portion, whereby the central region has a higher temperature while the peripheral portion is unlikely to increase the temperature. In contrast, if the spot has a wider width in the direction perpendicular to track, a quantity of light is dispersed to uniformly heat a broader area in the direction of track width. This can broaden the width of magnetized region and the temperature rise of spot center area can be controlled as well, preventing the magnetic deterioration due to the high power magnetization in the present embodiment.

There are a variety of conventional methods for broadening the spot size. One of the easiest methods is providing the focus servo control with offset. As well known, a laser beam is focused on the disk recording layer while controlling the axial position of focusing lens, in drive devices, various disk inspectors or meters. If this control is given an offset, a defocused spot can be formed on the recording layer.

For example using a magnetic modulation type disk dynamic characteristic inspecting apparatus provided with a condenser lens with NA=0.5 and providing the focus servo control with defocus offset of about 2 μm, the spot diameter changed from the range of 1.3 to 1.5 μm as focused, to the range of 2.0 to 3.0 μm. Magnetization was carried out with the aforementioned alternating field using the disk dynamic characteristic inspector. Then magnetized regions were formed as cellularly divided portions on the both sides of land with alternately changing directions of magnetization.

The following method is also preferable as another method for widening the spot width in the direction perpendicular to track. As well known, a semiconductor laser used as a light source in ordinary disk drives generally forms an elliptic spot in far field light quantity distribution. This elliptic spot is normally changed into a circular spot on the disk by beam size correcting means such as a beam shaping prism or the like in a path of projection optical system. It is well known that an elliptic spot is formed on the disk recording layer by removing the beam size correcting means or by decreasing the correction ratio from the conventionally used ratio. Aligning the direction of major axis of the elliptic spot with the direction perpendicular to track, a spot is formed with a broader width perpendicular to the track and with a wide distribution of laser power in the direction of width.

There are a variety of spot beam correcting means well known in the field of the art in addition to the above methods, for example means for intentionally causing astigmatism in optical system, such as inserting a parallel glass oblique to the optical axis in diverging optical path. All such means can be applicable to the present embodiment.

Embodiment 2

The second embodiment of the present invention is directed to such an arrangement that grooves, or lands and grooves are scanned one by one for thermomagnetic magnetization by a laser spot so that each groove is magnetized in the entire width to form cellularly magnetized regions with alternately changing directions of magnetization.

In the present embodiment, magnetization is effected by track-trace of a heating laser beam spot along a groove under external application of alternating magnetic field. It is known that this trace can be achieved by an ordinary drive device in the same manner as track-trace of land. For example, the track trace may be of the push-pull detection track servo method, which will be described. A focusing lens focuses reflected light from disk on a sensor. If a spot is located at the center of land (in the direction of width) or groove (in the direction of width) on the disk in this case, the disk recording layer is symmetric with respect to the symmetry axis which is a line passing through the center thereof in parallel with the track. Then the returning light of spot to the lens has a distribution of light quantity on the pupil of lens symmetric with respect to the symmetry axis of line passing trough the center of lens pupil in the track direction. In case the spot is deviated from the center position of the width, the symmetry is destroyed. Then the deviation from the center in the direction of width is detected by detecting by a sensor a difference in quantity of light incident into the pupil between two areas divided by a line passing through the pupil center in the track direction (push-pull signal). With the detected signal, the servo control is executed to move the lens in the direction perpendicular to track. The push-pull signal is 0 when the spot is located either at the center of land or at the center of groove. The detection of land or groove is made using for example the relation with a change in light quantity of total reflection into the pupil (track cross signal) and therefore the trace of groove can be possible by inverting this relation.

Figure 3:
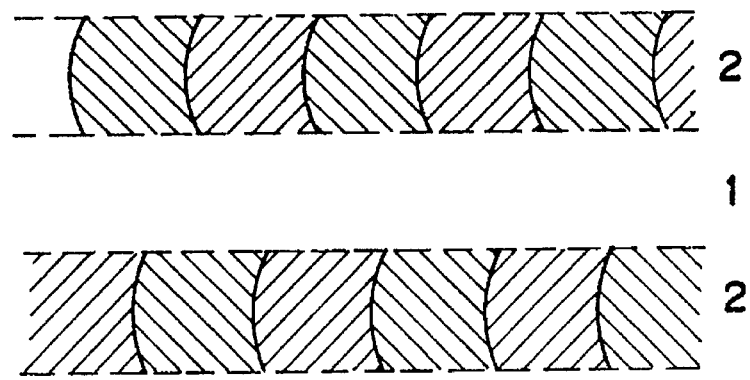
FIG. 3 is a drawing to show an example of another magnetized region in a magneto-optical disk according to the present invention.

FIG. 3 shows a state of magnetization in grooves based on the second embodiment of the present invention. Numeral 1 denotes a land and 2 a groove, which is cellularly magnetized in alternately changing magnetization directions. Thus, only grooves, or both grooves and lands (by ordinary trace)

can be magnetized. In the present embodiment, the grooves are magnetized across the entire width thereof (though the magnetization is not always necessary in portions expecting no writing of information pits in the track direction of course) in order to enhance the canceling effect of leaking fields from the grooves, while preventing the deterioration of recording layer due to laser beam heating in thermomagnetic magnetization.

In the present embodiment, the magnetization is effected such that the alternating magnetic field is applied to a groove while scanning the groove with a laser beam. The present embodiment requires that the power of irradiating laser beam can magnetize the entire width of each groove, but does not require such a regulation that the power must be over the writing power used in normal drive as required in the previous embodiment. Employing the method in the present embodiment, the grooves can be cellularly magnetized in alternately changing magnetization directions across the entire width thereof without causing deterioration of recording layer by the laser beam in magnetization. A lower laser power can be also employed in the same manner for magnetization of both lands and grooves. In the first embodiment, if a recording layer should be low in permissible amount of irradiation of laser beam against the deterioration, it would be difficult to magnetize the entire region of each groove. In contrast, it is possible in the present embodiment that the entire area of each groove is magnetized regardless of the property of recording layer, whereby the canceling effect of leaking fields can be enhanced.

As an additional example, two adjacent grooves on either side of land can be magnetized in a zigzag pattern of cellularly magnetized elements. This can be achieved by changing the phase of alternating field in magnetization between the two adjacent grooves. In this case, two elements on either side of land have different magnetization directions in formation of user pit, so that magnetic fields from the magnetization in the elements cancel each other to enhance the canceling effect of leaking fields in total.

To further enhance the canceling effect of leaking fields, the entire region of disk surface can be magnetized by groove trace and land trace in a pattern of fine regions cellularly divided. The magnetization of entire area can be well done with a power of irradiation laser almost equivalent to the power for writing of normal pits, which is preferable because of lower possibility of deterioration of disk recording layer. Further, the lower power of irradiation laser enables magnetization at higher speed of disk rotation than in Embodiment 1, shortening the period of magnetization.

Also, the deterioration of disk magnetic layer can be well prevented by a method of pulse irradiation of laser synchronized with the alternating magnetic field applied.

The magnetization method of the present invention can be executed using an ordinary drive device. Therefore, if a drive device is preliminarily given the function of magnetization of the present embodiment, a magneto-optical disk can be magnetized at any time before or after shipment.

Embodiment 3

The third embodiment of the present invention is directed to a magneto-optical disk which has thermomagnetically magnetized regions as smaller cellular regions with alternately changing magnetization directions than the shortest length of pit used in user recording. As described above, the averaging effect of leaking fields is caused such that the magnetic layer around a pit generating a magnetic field has cellular regions with alternately changing magnetization directions and the cellular regions produce magnetic fields different in direction to cancel each other. Then, the averaging cancellation effect can become more and more enhanced as the size of cellular unit region becomes smaller than the size of written pits.

It is thus preferred that the size of cellular unit region is smaller than pits used in user recording, particularly than the shortest pit. From the reason as described below, the same effect, however, can be attained by magnetization with shorter cellular unit regions in the alternately changing magnetization directions than the length of pits recorded by user at least in the track direction, i.e., in the scanning direction of user writing spot.

Leaking fields especially from proximate magnetized regions are more influential around the recording portion, as described above. Then, while a user performs pit writing, there are regions with changing magnetization directions aligned on a line tangent to pits written in scanning. If the averaging cancellation is always effective along this line, the averaging can be made in the region where influence is great to the leaking fields. Making the size of cellular unit magnetized region along the direction smaller than the user pit length shows a remarkable effect on the averaging cancellation of leaking fields in particular.

Further, the magnetization of making the length of unit magnetized region in the track direction shorter than the user pit length can be suitably achieved by the means as described in the Embodiment 1 or Embodiment 2 of the present invention as described above, or by a method as described below.

While a disk is scanned with a focused spot of continuously irradiating laser, an alternating field is externally applied. A unit region magnetized in this occasion has a length in the spot scanning direction which is not determined by the diameter of generally irradiating spot, but by the scanning speed and the period of alternating field applied. A drive device has the same structure as an ordinary magnetic modulation drive device. Using the drive device and suitably combining the disk rotation speed with the period of magnetic modulation, magnetization can be effected with a unit region smaller than the spot diameter in the track direction and shorter than the length of pits produced at the period of magnetic modulation in user use. Then the alternating field is applied to obtain cellular regions with alternately changing magnetization directions.

For example, with linear velocity of 7.5 m/sec (corresponding to rotation of 1800 rpm and disk radius of r=40 mm) and with application of alternating field of 10 MHz, a unit magnetized region has the length of about 0.4 μm in the track direction.

Also, the same magnetization can be done by pulse modulation of irradiating laser beam synchronized with the alternating field.

As detailed above, the present embodiment is characterized in that a disk is magnetized in a pattern of cellular regions with alternately changing magnetization directions at least shorter in the track direction than the spot used by user. Let us consider a case in which the size of writing spot is equal to that of reading spot (which is conventionally often used). In this case, cellular regions are formed in a size at least smaller in the track direction than the spot used in user reading and than the recorded pit length. The magnetized regions with alternately changing magnetization directions (at least in the track direction) are formed around the recording pit string (at least on the both sides thereof). The magnetized region is read by a part of reading spot beam, which is characteristic in the present embodiment.

The present embodiment has the following specific effect because of such arrangement. In the conventional magneto-optical disk, the region surrounding pits is uniformly magnetized in a certain magnetization direction (which is generally opposite to that in pit). A reading spot is normally larger than the size of pits and has a spot diameter wider than the width of land for detection of push-pull signal for servo. A magneto-optical signal detected by the reading spot beam generally includes as offset a magneto-optical component from the magnetization around the spot, especially from the magnetization on the both sides of pit string including the grooves. Since the offset is affected by disturbance as described, it could be an unstable factor for magneto-optical signal. The disturbance is for example crosstalk from signals in adjacent tracks. Generally, a signal pit string has a deviation in the (radial) direction perpendicular to track due to the tracking servo error or the like, and this deviation causes crosstalk of pit string signal of track, which is due to a variation. This is caused when portions of pits on the adjacent tracks are included in the reading spot and magneto-optical signals from the portions are read. Also, another example of disturbance is a problem of signal remnant upon overwriting. The overwriting is performed such that a new pit string is newly written over an already-written signal string in accordance with another modulation signal. There is a chance that the old signal pits are not perfectly erased to remain a part thereof because of the tracking deviation similarly by the servo error or a variation of writing conditions of writing laser power. The remnant pit portion remains on the both sides of new signal pit string. Since the remnant is on the same track, it gives the offset of greater influence than the crosstalk. Such crosstalk variations would be factors to keep the overall magneto-optical signal unstable.

In the magneto-optical disk according to the present embodiment, as compared with the structure of conventional magneto-optical disks as described, the region around pits, at least the region on the both sides of pit string is magnetized in a pattern of cellular regions with alternately changing magnetization directions, smaller (at least in the track direction) than the (shortest) pit length for user's use. The ordinary drive device employs a laser beam spot for reading and a spot for writing equivalent to each other, which is nearly the limit size (optical resolution)) for optically resolving the shortest pits for user's use to be detected. Therefore, the size of each unit of the above cellular magnetized regions cannot be optically resolved, so that the entire region is detected as halftone. Then the magnetized regions on the both sides of pit string are detected as a magneto-optical signal of intermediate value between 1 and 0, which represent presence and absence of pit, respectively. The offset amount of magneto-optical signal detected from the regions is smaller than that in the conventional cases. (It is about a half.) Since the magneto-optical disk according to the present invention has such a smaller offset amount for magneto-optical signals, the disk has only a small variation of the total magneto-optical signal even with a change of offset amount due to the disturbance such as the crosstalk and the signal remnant as described above.

Figure 5:
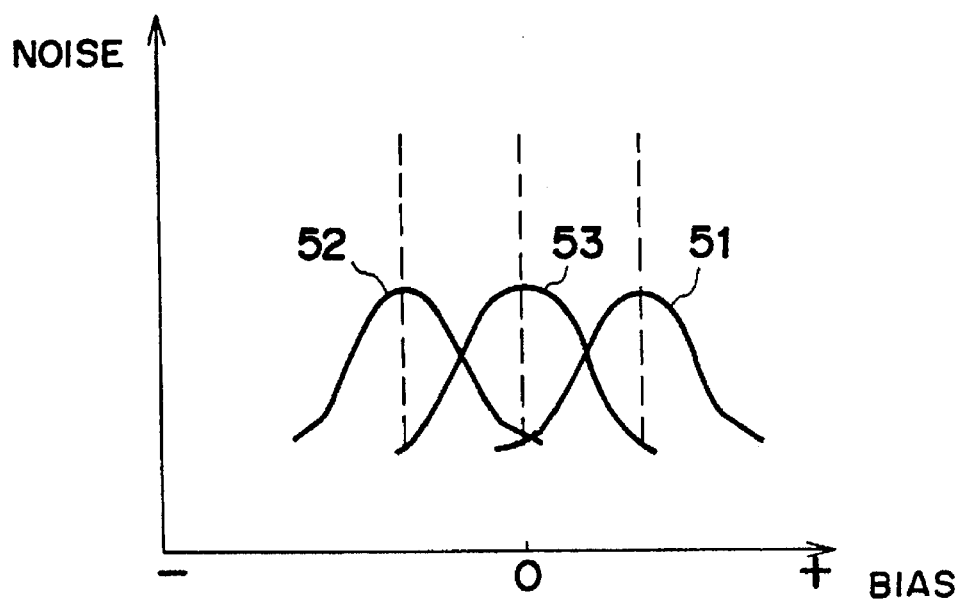
FIG. 5 is a drawing to show characteristics of a magneto-optical disk of the present invention against applied magnetic field.

FIG. 5 shows noise characteristics in reproduction for a disk in which data was written by DC laser beam while applying a DC bias magnetic field. The horizontal axis indicates the bias magnetic field applied upon writing. Numeral 51 represents the result from a disk the entire surface of which is initially magnetized uniformly in a certain magnetization direction, 52 a result from a disk the entire surface of which is initially magnetized uniformly in the opposite direction to the said direction, and 53 a result from a disk which is magnetized according to the present invention in a pattern of cellularly magnetized regions with alternately changing magnetization directions on the both sides of land. The patterns 51, 52 are shifted by leaking fields such that their noise peaks are symmetric with respect to the bias field 0, while the noise pattern 53 shows that the leaking fields well cancel each other.

Figure 6:
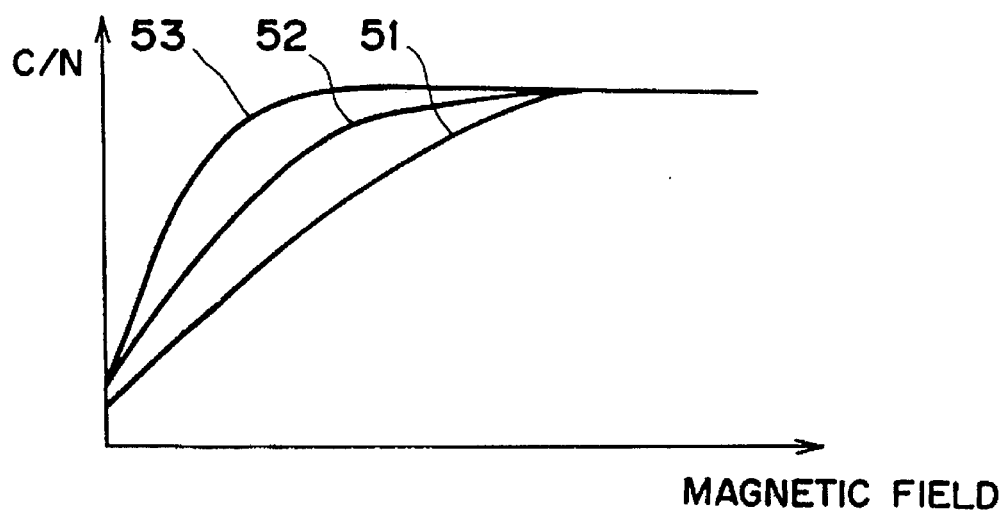
FIG. 6 is a drawing to show the magnetic sensitivity of a magneto-optical disk according to the present invention.

FIG. 6 is a graph to show sensitivities of magnetic field in recording by the magnetic modulation method for the disks 51, 52, 53. The vertical axis represents C/N in reproduction and the horizontal axis the applied field. The disk 53 is especially excellent in rise of C/N even with low applied field, removing unstableness due to the leaking fields.

In case the disk of the present invention is used for magnetic modulation, it is excellent in sensitivity of magnetic field and suitable as a disk with high density and high transfer rate.

The frequency of alternating field in each embodiment as described above is preferably constant in application of magnetic field (i.e., the cellularly divided regions with alternately changing magnetization directions are arranged at constant intervals), but the frequency may be changed in application of magnetic field within the range of the effect in the present invention.

What is claimed is:

1. A magneto-optical disk in which information is recorded by forming a magnetic pit recording string by thermomagnetic recording on a recording region of a magnetic member and the information is read-out by detecting the recorded pits utilizing the photomagnetic effect, comprising:

cellularly divided regions provided at two sides outside and adjacent to user's the recording region on which a pit string is to be formed, wherein the respective directions of magnetization of said divided regions alternate in different directions.

2. A magneto-optical disk according to claim 1, wherein said disk has a land portion and a groove portion, and said pit string is formed on the land portion.

3. A magneto-optical disk according to claim 1, wherein said cellularly divided regions having directions of magnetization that alternate in different directions are periodically arranged.

4. A magneto-optical disk including a magnetic member having a land portion and a groove portion, and in which a magnetic recording pit string is formed on the land portion using thermomagnetic recording on the magnetic member and the magnetic recording pit string is read-out utilizing the photomagnetic effect, said disk comprising:

cellularly divided regions provided at two sides outside and adjacent to user's the land portion, wherein the respective directions of magnetization of said divided regions alternate in different directions.

* * * * *

UNITED STATES PATENT AND TRADEMARK OFFICE
CERTIFICATE OF CORRECTION

PATENT NO. : 5,644,556

DATED : July 1, 1997

INVENTOR(S) : KATSUYA OIKAWA

It is certified that error appears in the above-identified patent and that said Letters Patent is hereby corrected as shown below:

Title page,
TITLE
item [54] and col. 1, line 4,
"MAGNETIZATION AND" should read --MAGNETIZATION, AND--.

References Cited
[56]
Insert --5,278,809  1/1994  Ogata  369/13--.

COLUMN 1
Line 4, "MAGNETIZATION AND" should read --MAGNETIZATION, AND--.
Line 30, "magneto optical" should read --magneto-optical--.
Line 59, "disk," should read --the disk,--.

COLUMN 2
Line 7, "disk." should read --the disk.--.
Line 58, "moves" should read --moves,--.

UNITED STATES PATENT AND TRADEMARK OFFICE
CERTIFICATE OF CORRECTION

PATENT NO. : 5,644,556
DATED : July 1, 1997
INVENTOR(S) : KATSUYA OIKAWA

It is certified that error appears in the above-identified patent and that said Letters Patent is hereby corrected as shown below:

COLUMN 4
    Line 9, "of" (third occurrence) should be deleted.
    Line 58, "ON" should read --ON--.

COLUMN 13
    Line 29, "of" should be deleted.

COLUMN 14
    Line 38, "user's" should be deleted.
    Line 57, "user's" should be deleted.

Signed and Sealed this

Tenth Day of February, 1998

Attest:

BRUCE LEHMAN

*Attesting Officer*       *Commissioner of Patents and Trademarks*